United States Patent [19]

Taylor

[11] Patent Number: 5,073,433

[45] Date of Patent: Dec. 17, 1991

[54] THERMAL BARRIER COATING FOR SUBSTRATES AND PROCESS FOR PRODUCING IT

[75] Inventor: Thomas A. Taylor, Indianapolis, Ind.

[73] Assignee: Technology Corporation, Danbury, Conn.

[21] Appl. No.: 424,613

[22] Filed: Oct. 20, 1989

[51] Int. Cl.$^5$ ............................................... B32B 3/00
[52] U.S. Cl. ..................................... 428/134; 427/257; 427/258; 427/269; 427/136; 427/155; 427/332; 427/697; 501/39; 501/80
[58] Field of Search .................. 427/257, 258, 269; 428/697, 155, 332, 136, 134; 502/30, 80

[56] References Cited

U.S. PATENT DOCUMENTS 4,822,689 4/1989 Fukubayashi et al. ............. 428/472

Primary Examiner—William J. Van Balen
Attorney, Agent, or Firm—Cornelius F. O'Brien

[57] ABSTRACT

A thermal barrier coating for substrates comprising zirconia partially stabilized by yttria and having a density greater than 88% of the theoretical density with a plurality of vertical macrocracks homogeneously dispersed throughout the coating to improve its thermal fatigue resistance. The invention also discloses a process for producing the thermal barrier coating.

20 Claims, No Drawings

THERMAL BARRIER COATING FOR SUBSTRATES AND PROCESS FOR PRODUCING IT

FIELD OF THE INVENTION

The invention relates to a thermal barrier coating and process for producing such a coating for substrates intended to operate in cyclic thermal environments, said coating comprising zirconia partially stabilized by yttria and having a substantial homogeneous dispersion of vertical macrocracks throughout the coating to improve its thermal fatigue resistance.

BACKGROUND OF THE INVENTION

Modern gas turbine engines operate in high temperature environment in excess of 2000° F. in which hot gases are expanded across rows of turbine blades. Outer air seal or shroud segments circumscribe the turbine blades to minimize leakage of the gases over the tips of the blades. The use of thermal barrier coatings on gas turbine blades and surfaces such as such as shroud segments have been found to have several advantages. Through the use of thermal barrier coatings higher operating efficiency can be obtained because less cooling air is required to maintain blade or shroud temperatures. In addition, component life is extended since the rate of change of metal temperature is reduced by the insulating effect of the thermal barrier.

Zirconia based thermal barrier coatings, because of their low thermal conductivity, are added to the surface of metal components to insulate them from the hot gas stream. Stabilized zirconia was developed and used as a thermal barrier coating for turbine and shroud components. Coatings such as CaO stabilized zirconia, MgO stabilized zirconia and $Y_2O_3$ stabilized ziconia have been tested with $Y_2O_3$ partially stabilized zirconia providing the best results.

U.S. Pat. No. 4,377,371 discloses an improved thermal shock resistance of a ceramic layer in which benign cracks are deliberately introduced to a plasma-sprayed ceramic layer. The benign cracks are generated by scanning a laser beam over the plasma-sprayed ceramic surface where the ceramic material immediately beneath the beam melts to produce a thin fused layer. Shrinkage accompanying cooling and solidification of the fused layer produces a network of microcracks in the fused layer that resists the formation and growth of a catastrophic crack during thermal shock exposure. Another method disclosed for introducing fine cracks on the surface of a ceramic coating is to quench the surface of the ceramic while it is hot with an ethanol saturated paper pad.

An article published by the AIAA/SAE/ASME 16th Joint Propulsion Conference, June 30–July 2, 1980, Development of Improved-Durability Plasma Sprayed Ceramic Coatings for Gas Turbine Engines by I. E. Summer et al, discloses that the durability of plasma sprayed ceramic coatings subjected to cyclic thermal environment has been improved substantially by improving the strain tolerance of a ceramic structure and also by controlling the substrate temperature during the application of the coating. It further states that the improved strain tolerance was achieved by using ceramic structures with increased porosity, microcracking or segmentation.

In an article published by J. Vac. Sci. Technol. A3 (6) November/December 1985 titled Experience with MCrAl and Thermal Barrier Coatings Produced Via Inert Gas Shrouded Plasma Deposition, by T. A. Taylor et all, discloses the depositing of a ceramic oxide coating of $ZrO_2$-7 wt % $Y_2O_3$ onto a coated substrate. The ceramic oxide coating is a thermal barrier coating which has intentionally imparted microcracks having an average spacing of about 15 microns and which are staggered from layer to layer of the coating.

It is an object of the present invention to provide a thermal barrier coating for components intended to be used in cyclic thermal environments in which the thermal barrier coating has deliberately produced macrocracks homogeneous dispersed throughout the coating to improve its thermal fatigue resistance.

It is another object of the present invention to provide a thermal barrier coating for components of turbine engines in which the coating is composed of zirconia partially stabilized by yttria and in which the coating has a density greater than about 88% of theoretical.

It is another object of the present invention to provide a thermal barrier top coating over a bond coating of an alloy containing chromium, aluminum, yttrium with a metal selected from the group consisting of nickel, cobalt and iron.

It is another object of the present invention to provide a thermal barrier coating for gas turbine blades, vanes and seal surfaces exposed in the hot section of gas turbine engines.

It is another object of the present invention to provide a process for producing a thermal barrier coating having good thermal fatigue resistance.

SUMMARY OF THE INVENTION

The invention relates to a thermal barrier coating for protecting a substrate such as blades, vanes and seal surfaces of gas turbine engines, said coating comprising zirconia partially stabilized by yttria, having a density greater than 88% of the theoretical density, and having a plurality of vertical macrocracks substantially homogeneously dispersed throughout the coating in which a cross-section area of the coating normal to the surface of substrate exposes a plurality of vertical macrocracks with at least 70%, preferably at least 90%, of said macrocracks extending at least 4 mils, preferably 8 mils, in length up to the thickness of the coating and having 20 to 200 vertical macrocracks, preferably from 75 to 100 vertical macrocracks, per linear inch measured in a line parallel to the surface of the substrate and in a plane perpendicular to its substrate. The length of at least 70%, preferably 90%, of the vertical macrocracks should extend at least 4 mils so that they pass through at least 50 splats of the deposited powder.

The invention also relates to a process for producing a thermal barrier coating having good thermal fatigue resistance comprising the steps:

a) thermally depositing zironia-yttria powders onto a substrate to form a monolayer having at least two superimposed splats of the deposited powders on the substrate in which the temperature of a subsequent deposited splat is higher than the temperature of a previously deposited splat;

b) cooling and solidifying said monolayer wherein said monolayer has a density of at least 88% of the theoretical density and wherein a plurality of vertical cracks are produced in the monolayer due to shrinkage of the deposited splats;

c) repeating steps a) and b) at least once to produce an overall coated layer in which each monolayer has induced vertical cracks through the splats and wherein at least 70% of the vertical cracks in each monolayer are aligned with vertical cracks in an adjacent monolayer to form vertical macrocracks having a length of at least 4 mils up to the thickness of the coating and said coated layer having at least 20 vertical macrocracks per linear inch measured in a line parallel to the surface of the substrate.

As used herein, a splat shall mean a single molten powder particle impacted upon the surface of the substrate wherein it spreads out to form a thin platelet. Generally these platelets are from 5 to 100 microns in diameter and 1 to 5 microns thick, more generally about 2 microns thick.

As used herein, a vertical macrocrack is a crack in the coating if extended to contact the surface of the substrate will form and angle of from 30° to 0° with a line extended from said contact point normal to the surface of the substrate. Preferably, the vertical macrocracks will form an angle of 10° to 0° with the normal line. In addition to vertical macrocracks, one or more horizontal macrocracks may develop in the coating. Preferably, the coating should have no horizontal macrocracks. A horizontal macrocrack is a crack forming an angle of from 10° to 0° with a plane bisecting said crack and diposed parallel to the surface of the substrate. If present, the horizontal macrocracks preferably should not extend to contact more than one vertical macrocrack since to do so could weaken the coating and subject the coating to spalling. The length dimension of the vertical macrocrack and the length dimension of the horizontal macrocrack is the straight line distance from one end of the crack to the opposite end of the crack. The length of the horizontal macrocrack, if present, could be from about 5 to 25 percent of the average length of the vertical macrocracks on both sides of the horizontal macrocrack.

For most applications, the density of the coating preferably should be between 90% and 98% of the theoretical density and most preferably about 92 percent of the theoretical density. The vertical macrocracks are formed in the coating by plasma depositing powders of the coating onto the surface of the substrate in discrete monolayers in which the thickness of each monolayer contains at least two superimposed splats of the deposited powder (about 0.16 mils) and preferably from about four to five splats of the deposited powder (from about 0.32 mils and 0.40 mils, respectively). Although not bound by theory, it is believed that the deposit of two or more superimposed splats of the powder will result in the second and subsequent splats being deposited at higher temperatures than the preceding splats. This is due to the fact that the first splat of the powder is deposited on a relatively colder substrate while the second and subsequent splats are deposited on preceding splats that are progressively hotter. Thus the overall deposit of two or more splats results in a temperature gradient with the higher temperature at the top surface. Upon cooling and solidification of the monolayer deposit, the second and subsequent splats shrink more than the preceding splats and form vertical microcracks through the deposited layer. Additional monolayers are superimposed on the substrate with each monolayer forming vertical macrocracks which have a tendency to align with the previously formed macrocracks in the preceding monolayers. This effectively produces some macrocracks that extend substantially through the thickness of the coating. The width of the vertical macrocracks, i.e., the distance between opposing faces defining the vertical macrocracks, is generally less than about 1 mil, preferably less than $\frac{1}{2}$ mil.

It has been found that if the density of coating is less than 88% of the theoretical density, the stress caused by the shrinkage of splats in the monolayer may be absorbed or compensated by the porosity of the coating. This will effectively prevent the formation of the macrocracks throughout the coating as is required according to this invention and prevent producing a coating with good thermal fatigue resistance. The substantial homogeneous distribution of vertical macrocracks throughout the coating as requied by this invention will reduce the modulus of elasticity of the coating structure thereby reducing the local stresses. This results in excellent thermal fatigue resistance for the coating that enables it to function without failure in cyclic thermal environments.

The density of the vertical macrocracks should be preferably 75 or more, most preferably 100 or more, vertical macrocracks per linear inch taken in a cross-section plane of the coating along a line parallel to the surface of the substrate. This will insure that sufficient vertical macrocracks are present in the coating to provide good thermal fatigue resistance. To obtain the necessary vertical macrocracks in this coating, the plasma apparatus should be of high efficiency and stable over the period of depositing the coating. The spray torch should be positioned at a fixed distance from the substrate and the relative speed between the torch and the substrate should be controlled to insure that the monolayer instantly put down by one sweep of the torch will be sufficient to produce overlap of the deposited splats of powder in which the second and subsequent deposited splats are hotter than the preceding deposited splats for the reason discussed above. The overall thickness of the coating can vary depending on the end use application. For components of gas turbine engines, the coating thickness can vary from 0.003 to 0.10 inch. The preferred zirconia partially stablized by yttria would be 6 to 8 weight percent yttria with the balance zirconia and most preferably about 7 weight percent yttria with the balance substantially zirconia. The thermal barrier coating of this invention is ideally suited as a top coat for a metallic bond coated substrate such as blades, vanes and seals of gas turbine engines. The preferred metallic bond coating would comprise an alloy containing chromium, aluminum, yttrium with a metal selected from the group consisting of nickel, cobalt and iron. This bond coating can be deposited using conventional plasma spray techniques or any other conventional technique. The substrate could be any suitable material such as a nickel-base, cobalt-base or iron-base alloy.

While the preferred embodiment of the invention has been described, it will be appreciated that various modifications may be made to the thermal barrier coating without departing from the spirit or scope of the invention.

Thermal Fatigue Test

Cyclic thermal exposure can help distinguish between a number of candidate thermal barrier coatings with regard to thermal fatigue resistance. A good thermal barrier coating must be able to survive a large number of thermal cycles to high temperature without spalling if it is to be useful in service.

To test the samples of this invention, a round metal alloy disc coated with a thermal barrier coating on one face was fabricated. The coated face was exposed to a high heat flux gas burner while the metal back face was allowed to cool by convection in air. The apparatus was automated with timers and a stepping motor which place the coated disc in the flame of a gas burner for a fixed time then move it out of the flame and to a second position where an air blast cools the coated face. The time at each position is adjustable, as well as the maximum temperature reached at the heating position. In the test work described herein the fixed variables of the test were as follows:

20 seconds heating to 2550° F. (average maximum temperature measured on the thermal barrier coated face) wherein the back metal face reaches about 1400° F., followed by 20 seconds blast air cooling to about 1500° F., followed by 40 seconds natural convection cooling to 850° F. (average minimum temperature measured on the thermal barrier coated face)

2000 heating/cooling cycles constitutes the full test.

The thermal barrier coated layer thicknesses and compositions were as follows:

6 to 8 mil thick bond coating of Co-32N-21Cr-8Al-0.5Y composition and 43 to 47 mil thick topcoat of a thermal barrier layer of $ZrO_2$-6 to 8 weight percent $Y_2O_3$ composition.

Before starting the thermal test, the edge of the coated disk was polished so that the thermal barrier coating would display any separation cracks that might be induced by the thermal test. These separation cracks are horizontal cracks within the thermal barrier layer that are visible at the polished edge. Usually, if a coating is susceptible to this cracking, a number of short horizontal crack segments are seen to grow and link up around the edge circumference of the thermal barrier layer. Usually the location of these cracks is within 5 to 15 mils of the bond coat interface. The lengths of these individual or linked cracks are measured after the thermal test. A stereoscopic microscope at 30× magnification is used to detect all such cracks. The total length of edge cracks is expressed as a percentage of the circumference length; i.e., 100% edge cracking would have a visible crack fully around the entire edge circumference. In some cases where 100% edge cracking would occur, the thermalbarrier layer could spall off. In other cases, it remains bonded by uncracked areas deeper into the coating. In either case, 100% or other high percentage edge cracking results are taken as indicative of poor thermal fatigue resistance of that particular thermal barrier specimen. Thermal barrier coatings that have a low percentage of edge cracking at the conclusion of the test are considered to have good thermal fatigue resistance. Thermal barrier coatings that have zero percent edge cracking at the end of the test are considered to have outstanding thermal fatigue resistance.

EXAMPLE 1

In this example, three different zirconium-yttrium oxide thermal barrier coatings (Samples A, B, and C) were prepared to have different macrocrack structures and then subjected to the thermal cycle test. All coatings were made from the same starting powder having the following characteristics shown in Table 1.

TABLE 1

| Powder Characteristics | |
|---|---|
| Composition: | 7.11 wt. % $Y_2O_3$, 0.23 $SiO_2$, 0.15 $TiO_2$, 0.07 $Al_2O_3$, 0.09 $Fe_2O_3$, balance $ZrO_2$ |
| Type powder: | fused and crushed |
| Size analysis: | +200 mesh 0.0 wt. percent |
| | +230 mesh 0.0 wt. percent |
| | +325 mesh 18.55 wt. percent |
| | −325 mesh 81.45 wt. percent |

Using Microtrac@ analysis, the mean particle diameter size was found to be 40.95 microns.
@Microtrac powder size analysis instrument, Model 7995-11 by Leeds and Northrup Co.

All three coatings were deposited on 1 inch diameter × ⅛ inch thick Inconel 718 discs. All sample discs had a 6 mil bond undercoat of a plasma sprayed alloy of Co-32Ni-21Cr-8Al-0.5Y.

A number of specimens were made for each sample. A specimen of each sample was mounted on edge in epoxy resin, cured under pressure, then polished in cross-section so that the structure could be quantitatively analyzed. The high pressure epoxy cure allows penetration of epoxy into the somewhat porous zirconium-yttrium oxide layer which then better preserves the nature of the structure during abrasive polishing. The specimens were examined at 100× using a Leitz Orthoplan microscope, for an analysis of the microcrack structure. Separate specimens of the thermal barrier layer samples were carefully removed from the substrates and measured for their density. The density procedure using the water immersion method is described in ASTM B-328. All were sprayed with the same Union Carbide plasma torch, Model 1108. Certain torch operating parameters, standoff distance from torch to substrate and substrate velocity past the torch spray were changed in this example, to show how superior thermal fatigue resistance can be achieved. The properties and test data for each sample specimen are shown in Tables 2, 3, and 4.

TABLE 2

| | | Plasma Spray Conditions+ | | | | | |
|---|---|---|---|---|---|---|---|
| Sample | Total coating thickness, mils | Powder* Feedrate | Torch Current, (amps) | Standoff (in) | Substrate** velocity | Monolayer Height (mils) | Final Coating Temperature |
| A | 45 | 90 | 150 | 0.75 | 6,000 | 0.16 | 317° F. |
| B | 45 | 90 | 150 | 0.75 | 12,000 | 0.07 | 341° F. |
| C | 45 | 50 | 170 | 0.87 | 2,750 | 0.34 | 472° F. |

*grams/minute
**inches/minute
+The primary torch gas flows for each sample was: 90 cfh torch gas, 90 cfh powder carrier (both argon), and 40 cfh auxiliary (hydrogen).

TABLE 3

| | | Thermal Barrier Layer Properties | | | |
|---|---|---|---|---|---|
| Sample | Density (gm/cm³) | % of Theoretical Density* | Vertical cracks length, (mils) | Vertical Macrocracks per Inch laterally | Horizontal Branch cracks length, (mils) |
| A | 5.471 | 90.29 | 4–10 | 77.6 | 1–2 |
| B | 5.485 | 90.53 | 0 | 0.0 | 0 |
| C | 5.539 | 91.42 | 20–40 | 86.4 | 2–4 |

***Theoretical density is the density of the pore-free materials, 6.059 gm/cm³ for $ZrO_2$ - 7.11 wt. % $Y_2O_3$, as derived from Ingel and Lewis, "Lattice Parameters and Density for $Y_2O_3$ - Stabilized $ZrO_2$", J. Am. Ceramic Society, Vol. 69, No. 4, p. 325, April, 1986.

TABLE 4

| | Thermal Fatigue Test Results |
|---|---|
| Sample | % Edge Cracks after 2000 Cycles |
| A1 | 32 |
| A2 | 0 |
| B1 | 100* |
| B2 | 100 |
| C1 | 0 |

*Failed early, after approximately 900 cycles.

The test results showed Sample C had the best thermal fatigue resistance with no edge cracking after the test. Sample A was intermediate with specimen A1 having 32% edge cracking and specimen A2 having 0%. Sample B was the worst having 100% edge cracking, and specimen B1 failing even before the end of the test.

Samples A and B can be compared to see the effect of the macrocracks in the coating structure. The densities of A and B are essentially the same. The torch operating parameters were the same, and the final coating temperatures were essentially the same. The substantial difference was that Sample A was coated with a 6,000 in/min substrate velocity and Sample B with 12,000 in/min. This was done to provide different buildup rates of the thermal barrier layers on the samples. The monolayer height of Sample A was 0.16 mils while that of Sample B was only 0.07 mils. The higher monolayer height on Sample A created sufficient stress in the $ZrO_2$-$Y_2O_3$ coating layer to produce macrocracks throughout the coating of Sample A. Sample A had about 77.6 cracks/inch on average, while Sample B, coated at the lower monolayer height had no cracks. With all other coating properties the same, the presence of the high number of macrocracks in Sample A is responsible for the much better thermal fatigue resistance, compared to Sample B which had no macrocracks.

Sample C is a case where the results of Samples A and B were applied to further control the macrocrack structure. In this case slightly higher torch current was used in order to increase deposition efficiency so that a lower powder feedrate to the torch would produce about the same coating volume deposited per minute on the sample specimen. A substantial change was also made to substrate velocity in order to produce an even higher monolayer height which induced even more macrocracking in the coating. Sample C was coated at 2750 inches/minute substrate velocity. Sample C had a 0.34 mil monolayer height and 86.4 vertical macrocracks per inch on average. After the 2000 cycle thermal test no edge cracking was found upon examination. This study showed that macrocracks can be inducted into the $ZrO_2$-$Y_2O_3$ coating by proper control of the coating parameters and that macrocracks are critical to the success of the coating in a thermal fatigue environment.

EXAMPLE 2

In this example, the coating parameters of Sample C of Example 1 were repeated with an entirely new setup. The powder characteristics of that coating material are shown in Table 5.

TABLE 5

| Powder Characteristics | |
|---|---|
| Composition: | 7.03 wt % $Y_2O_3$, 0.33 $SiO_2$, 0.15 $TiO_2$, 0.093 $Al_2O_3$, 0.09 $Fe_2O_3$, balance $ZrO_2$ |
| Type Powder: | Fused and crushed |
| Size Analysis: | |
| +200 mesh | 0.0 wt percent |
| +230 mesh | 0.0 wt percent |
| +325 mesh | 19.09 wt percent |
| −325 mesh | 80.87 wt percent |

Using Microtrac analysis, the mean particle diameter size was found to be 39.61 microns.

Two of the same type 1-inch diameter disc substrates were coated, again with the same undercoat as in Example 1. The torch parameters were the same as for Sample C, Example 1. One sample was coated with a slight variation on the standoff distance from torch to substrate as shown in Table 6.

TABLE 6

| | Plasma Spray Conditions | | | |
|---|---|---|---|---|
| Sample | Powder Feed Rate (gm/min) | Torch Current (amps) | Standoff (inches) | Substrate Velocity (in/min) |
| D | 50 | 170 | 0.87 | 2750 |
| E | 50 | 170 | 1.0 | 2800 |

Cross-sectional polished areas of each sample prior to thermal testing were examined using the optical microscope. Coating density was measured on separate samples as before. The data obtained are shown in Table 7. The coating characteristics of Samples D and E are comparable to Sample C, Example 1, and show that the macrocracks homogeneously produced throughout the coating can be reproducibly obtained.

TABLE 7

| | Coating Characteristics | | | | |
|---|---|---|---|---|---|
| Sample | Density (gm/cm³) | Density percent of Theoretical | Vertical macrocracks per inch | Vertical macrocrack length (mils) | Horizontal branch crack length (mils) |
| D** | 5.55 | 91.6 | 79.7 | 23.7 | 4 |
| E | 5.52 | 91.1 | 73.1 | 29.0 | 3 |

*Crack length and spacing values are an average of 30 or more measurements.
**Sample D also had several examples of horizontal branching cracks extending to contact two adjacent vertical macrocracks.

As shown in Table 7, Sample D, coated at slightly closer standoff, obtained a slightly higher density, slightly more vertical macrocracks per inch, but also had slightly longer horizontal branching cracks connected to the vertical macrocracks. In fact, Sample D had several examples of horizontal branching cracks extending to contact two adjacent vertical macrocracks.

The disc specimens were tested the same as in Example 1 using the thermal cycle test for 2000 cycles. The data obtained are shown in Table 8.

TABLE 8

| Thermal Fatigue Test Results | |
|---|---|
| Sample | % Edge Cracks after 2000 Cycles |
| D | 12 |
| E | 1 |

The results were again good for these samples prepared under thermal spraying conditions that would produce macrocracks. Any result of less than 15% edge cracking is considered excellent in this very severe thermal cycle test.

The results for Sample D in the thermal cycle test are good but not as outstanding as for Sample E. Table 7 shows that Sample D and E are very similar in characteristics, except that Sample D had instances where it had horizontal branching cracks that extended to contact two adjacent vertical macrocracks. This observation leads to the conclusion that it is preferrable to minimize the extent of the horizontal cracks, in order to obtain excellent thermal fatigue resistance.

What is claimed:

1. A thermal barrier coating for substrates comprising zirconia partically stabilized by yttria and having a density greater than 88% of the theoretical density with a plurality of vertical macrocracks substantially homogeneously dispersed throughout the coating in which a cross-sectional area of the coating normal to the substrate exposes a plurality of vertical macrocracks with at least 70% of said vertical macrocrack extending at least 4 mils in length up to the thickness of the coating and having from 20 to 200 vertical macrocracks per linear inch measured in a line parallel to the surface of the substrate and in a plane perpendicular to the substrate.

2. The thermal barrier coating of claim 1 wherein the density is from 90% to 98% of the theoretical density and wherein at least 90% of said vertical macrocracks extend at least 8 mils in length.

3. The thermal barrier coating of claim 1 or 2 wherein said coating has about 75 vertical macrocracks per linear inch measure in a line parallel to the surface of the substrate and in a plane perpendicular to the substrate.

4. The thermal barrier coating of claim 3 wherein said coating has about 100 vertical macrocracks per linear inch measured in a line parallel to the surface of the substrate and in a plane perpendicular to the substrate.

5. The thermal barrier coating of claim 1 or 2 wherein said coating contains one or more horizontal macrocracks extending within the coating parallel to the surface of the substrate.

6. The thermal barrier coating of claim 5 wherein the horizontal macrocracks do not contact more than one vertical macrocrack.

7. The thermal barrier coating of claim 1 or 2 wherein the width of the vertical macrocracks is less than 1 mil.

8. The thermal barrier coating of claim 1 or 2 wherein the density is greater than 90% of the theoretical density and the coating has at least 75 vertical macrocracks per linear inch measured in a line parallel to the surface of the substrate and in a plane perpendicular to the substrate.

9. The thermal barrier coating of claim 1 or 2 wherein the coating comprises 6 to 8 weight percent yttria balance substantially zirconia.

10. The thermal barrier coating of claim 9 wherein a bond coating is deposited between the substrate and the thermal barrier coating, said bond coating comprising an alloy containing chromium, aluminum, yttrium with a metal selected from the group consisting of nickel, cobalt and iron.

11. The thermal barrier coating of claim 10 wherein the density is at least 90% of the theoretical density and the coating has at least 100 vertical macrocracks per linear inch measured in a line parallel to the surface of the substrate and in a plane perpendicular to the substrate.

12. The thermal barrier coating of claim 11 wherein said thermal barrier coating thickness is from 0.003 to 0.10 inch.

13. A process for producing a thermal barrier coating having good thermal fatigue resistance comprising the steps:
   a) thermally depositing zirconia-yttrium powder onto a substrate to form a monolayer having at least two superimposted splats of the deposited powders on the substrate in which the temperature of a subsequent deposited splat is higher than the temperature of a previously deposited splat;
   b) cooling and solidifying said monolayer of step a) whereupon said monolayer has a density of at least 88% of the theoretical density and wherein a plurality of vertical cracks are produced in the monolayer due to shrinkage of the deposited splats;
   c) repeating steps a) and b) at least once to produce an overall coated layer in which each monolayer has induced vertical cracks through the splats and wherein at least 70% of the vertical cracks in each monolayer are aligned with vertical cracks in an adjacent monolayer to form vertical macrocracks having a length of at least 4 mils up to the thickness of the coating and said coated layer having at least 20 vertical macrocracks per linear inch measured in a line parallel to the surface of the substrate and in a plane perpendicular to the substrate.

14. The process of claim 13 wherein in step a) said powder comprises 6 to 8 weight percent yttria balance substantially zirconia.

15. The process of claim 13 wherein in step a) the monolayer comprises at least 5 superimposed splats.

16. The process of claim 13 wherein in step b) the density is at least 90% of the theoretical density.

17. The process of claim 15 or 16 wherein the coating in step c) has from 20 to 200 vertical macrocracks per linear inch measured in a line parallel to the surface of the substrate and in a plane perpendicular to the substrate.

18. The process of claim 15 or 16 wherein the substrate in step a) comprises a bond coated substrate wherein the bond coating comprises an alloy containing chromium, aluminum, yttrium with a metal selected from the group consisting of nickel, cobalt, and iron.

19. The process of claim 18 wherein in step c) the length of the vertical macrocracks is at least 8 mils up to the thickness of the coating.

20. The process of claim 19 wherein in step c) the thickness of the coating is from 0.003 to 0.10 inch.

* * * * *

REEXAMINATION CERTIFICATE (2714th)

United States Patent [19]

Taylor

[11] B1 5,073,433

[45] Certificate Issued Oct. 31, 1995

[54] THERMAL BARRIER COATING FOR SUBSTRATES AND PROCESS FOR PRODUCING IT

[75] Inventor: Thomas A. Taylor, Indianapolis, Ind.

[73] Assignee: Praxair S.T. Technology, Inc., North Haven, Colo.

Reexamination Request:
No. 90/003,326, Jan. 14, 1994

Reexamination Certificate for:
Patent No.: 5,073,433
Issued: Dec. 17, 1991
Appl. No.: 424,613
Filed: Oct. 20, 1989

[51] Int. Cl.[6] .................................................. B32B 3/10
[52] U.S. Cl. .................. 428/134; 427/257; 427/258; 427/269; 428/155; 428/332; 428/697; 428/136; 501/39; 501/80
[58] Field of Search ............................ 428/134; 427/257

[56] References Cited

U.S. PATENT DOCUMENTS

| | | | |
|---|---|---|---|
| 4,377,371 | 3/1983 | Wisander et al. | 415/174 |
| 4,430,360 | 8/1985 | Stecura | 428/633 |
| 4,457,948 | 7/1984 | Ruckle et al. | 427/34 |
| 4,481,237 | 11/1984 | Bosshart et al. | 427/376.4 |
| 4,503,130 | 3/1985 | Bosshart et al. | 428/632 |
| 4,588,607 | 5/1986 | Matarese et al. | 427/34 |

OTHER PUBLICATIONS

"Experience with MCrAl and Thermal Barrier Coatings Produced Via Inert Gas Shrouded Plasma Deposition" T. A. Taylor et al J. Vac. Sci. Technol. A 3 (6), Nov./Dec. 1985, pp. 2526–2531.

"Thermal Fatigue of Plasma Sprayed $MgO.ZrO_2$ and $ZrO_2$–$6.6Y_2O_2$ Thermal Barrier Coatings", Taylor et al. 84th Annual Meeting American Ceramic Society, Cincinnati, Ohio, May 4, 1982.

"AIAA–80–1193 Development of Improved–Durability Plasma Sprayed Ceramic Coatings for Gas Turbine Engines", I. E. Sumner et al.
AIAA/SAE/ASME 16th Joint Propulsion Conference, Jun. 30–Jul. 2, 1980, Hartford Connecticut pp. 1–13.

"Experimental and Theoretical Aspects of Thick Thermal Barrier Coatings for Turbine Applications", Thermal Spray: Advances in Coatings Technology, National Thermal Spray Conference Sep. 14–17, 1987, Orlando, Florida, USA. pp. 155–166; G. Johner et al.

*Primary Examiner*—Christopher W. Raimund

[57] ABSTRACT

A thermal barrier coating for substrates comprising zirconia partially stabilized by yttria and having a density greater than 88% of the theoretical density with a plurality of vertical macrocracks homogeneously dispersed throughout the coating to improve its thermal fatigue resistance. The invention also discloses a process for producing the thermal barrier coating.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–20 are determined to be patentable as amended.

1. A *substrate coated with a* thermal barrier coating [for substrates], *said coating* comprising zirconia partially stabilized by yttria and having a density greater than 88% of theoretical [density with]*density, wherein said coating contains* a plurality of [vertical macrocracks] substantially homogeneously dispersed [throughout the coating] *vertical macrocracks extending into the coating from the substrate interface and* in which a cross-sectional area of the coating normal to the substrate exposes a plurality of vertical [macrocracks] *cracks* with at least 70% of said vertical [macrocrack extending] *cracks being in the form of macrocracks, said macrocracks having a length of* at least 4 mils [in length up to the thickness of the coating] and [having] *wherein said coating has* from 20 to 200 vertical macrocracks per linear inch measured in a line parallel to the surface of the substrate and in a plane perpendicular to the substrate.

2. The [thermal barrier coating] *coated substrate* of claim 1 wherein the density *of the coating* is from 90% to 98% of the theoretical density and wherein at least 90% of said vertical macrocracks extend at least 8 mils in length.

3. The [thermal barrier coating] *coated substrate* of [claim] *claims* 1 or 2 wherein said coating has about 75 vertical macrocracks per linear inch [measure] *measured* in a line parallel to the surface of the substrate and in a plane perpendicular to the substrate.

4. The [thermal barrier coating] *coated substrate* of claim 3 wherein said coating has about 100 vertical macrocracks per linear inch measured in a line parallel to the surface of the substrate and in a plane perpendicular to the substrate.

5. The [thermal barrier coating] *coated substrate* of [claim] *claims* 1 or 2 wherein said coating contains one or more horizontal macrocracks extending within the coating parallel to the surface of the substrate.

6. The [thermal barrier coating] *coated substrate* of claim 5 wherein the horizontal macrocracks do not contact more than one vertical macrocrack.

7. The [thermal barrier coating] *coated substrate* of [claim] *claims* 1 or 2 wherein the width of the vertical macrocracks is less than 1 mil.

8. The [thermal barrier coating] *coated substrate* of [claim] *claims* 1 or 2 wherein the density *of the coating* is greater than 90% of the theoretical density and the coating has at least 75 vertical macrocracks per linear inch measured in a line parallel to the surface of the substrate and in a plane perpendicular to the substrate.

9. The [thermal barrier coating] *coated substrate* of [claim] *claims* 1 or 2 wherein the coating comprises 6 to 8 weight percent yttria balance substantially zirconia.

10. The [thermal barrier coating] *coated substrate* of claim 9 wherein a bond coating is deposited between the substrate and the thermal barrier [coating,] *coating and the plurality of macrocracks extend into the coating from the bond coating interface,* said bond coating comprising an alloy containing chromium, aluminum, yttrium [with] *and* a metal selected from the group consisting of nickel, cobalt and iron.

11. The [thermal barrier coating] *coated substrate* of claim 10 wherein the density *of the coating* is at least 90% of the theoretical density and the coating has at least 100 vertical macrocracks per linear inch measured in a line parallel to the surface of the substrate and in a plane perpendicular to the substrate.

12. The [thermal barrier coating] *coated substrate* of claim 11 wherein said [thermal barrier] coating *has a* thickness [is] *of* from 0.003 to 0.10 inch.

13. A process for producing a thermal barrier coating having good thermal fatigue resistance comprising the steps:
   a) thermally depositing zirconia-yttrium powder onto a substrate to form a monolayer having at least two superimposed splats of the deposited powders on the substrate in which the temperature of a subsequent deposited splat is higher than the temperature of a previously deposited splat;
   b) cooling and solidifying said monolayer of step a) whereupon said monolayer has a density of at least 88% of the theoretical density and wherein a plurality of vertical cracks are produced in the monolayer due to shrinkage of the deposited splats;
   c) repeating steps a) and b) at least once to produce an overall coated layer in which each monolayer has induced vertical cracks through the [splats and] *splats;*
   wherein at least 70% of the vertical cracks in each monolayer *of the coated layer* are aligned with vertical cracks in an adjacent monolayer to form vertical macrocracks having a length of at least 4 mils [up to the thickness of the coating] *such that a plurality of vertical macrocracks extend into the coated layer from the substrate interface* and *wherein* said coated layer [having] *has* at least 20 vertical macrocracks per linear inch measured in a line parallel to the surface of the substrate and in a plane perpendicular to the substrate.

14. The process of claim 13 wherein [in step a)] said powder comprises 6 to 8 weight percent yttria balance substantially zirconia.

15. The process of claim 13 wherein [in step a)] the monolayer comprises at least 5 superimposed splats.

16. The process of claim 13 wherein [in step b)] the density *of the coated layer* is at least 90% of the theoretical density.

17. The process of [claim] *claims* 15 or 16 wherein the [coating in step c)] *coated layer* has from 20 to 200 vertical macrocracks per linear inch measured in a line parallel to the surface of the substrate and in a plane perpendicular to the substrate.

18. The process of [claim] *claims* 15 or 16 wherein the substrate [in step a)] comprises a bond [coated substrate] *coating and the plurality of macrocracks extend into the coated layer from the interface of the bond coating and the coated layer,* and wherein the bond coating comprises an alloy containing chromium, aluminum, yttrium [with] *and* a metal selected from the group consisting of nickel, cobalt[,] and iron.

19. The process of claim 18 wherein [in step c)] the length of the vertical macrocracks is at least 8 [mils up to the thickness of the coating.] *mils.*

20. The process of claim 19 wherein [in step c)] the thickness of the [coating] *coated layer* is from 0.003 to 0.10 inch.

* * * * *